June 20, 1939.    I. R. FARNHAM ET AL    2,163,376
POINTER SETTING MECHANISM
Filed Sept. 1, 1931    4 Sheets-Sheet 1
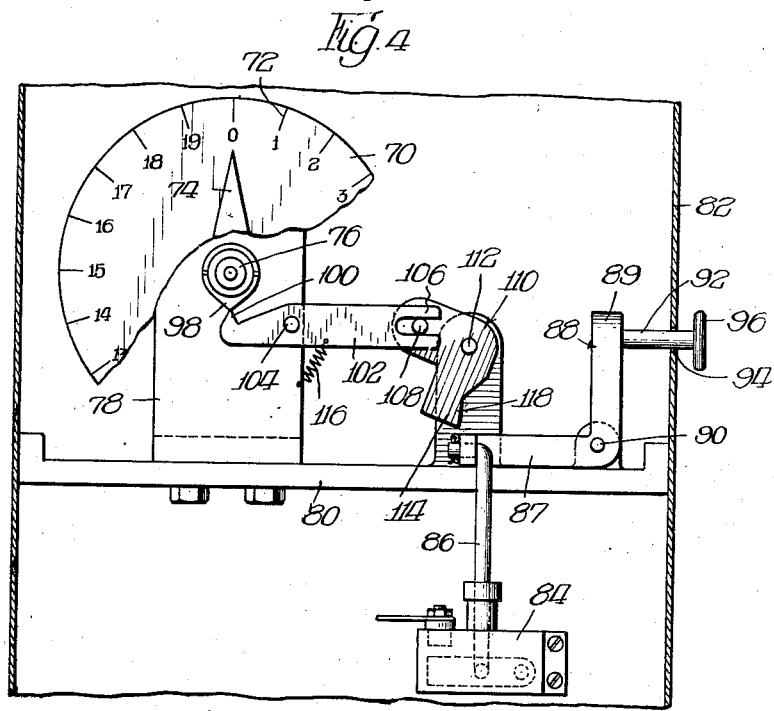
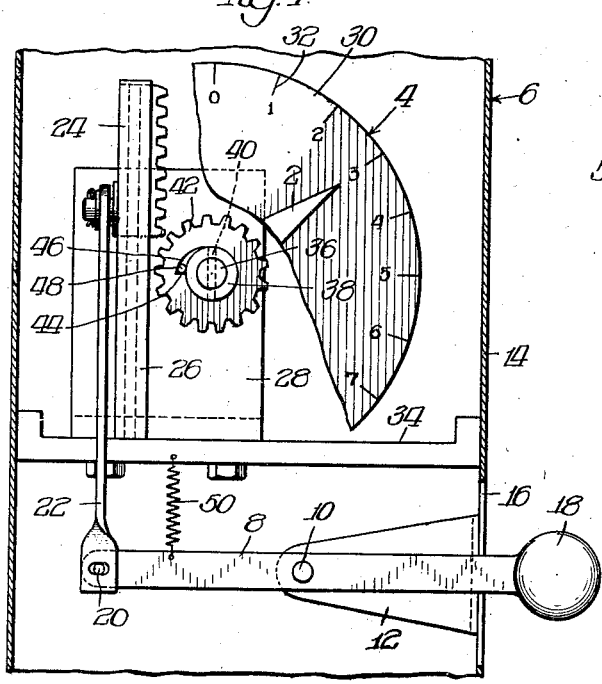
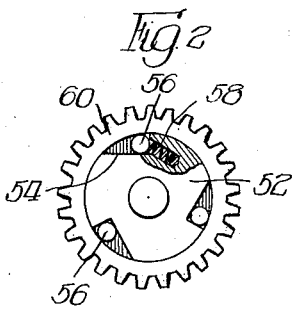
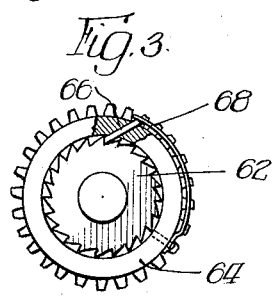
Inventors:
Ivan R. Farnham,
Robert J. Jauch,
By Wilkinson, Huxley, Byron & Knight
Attys.

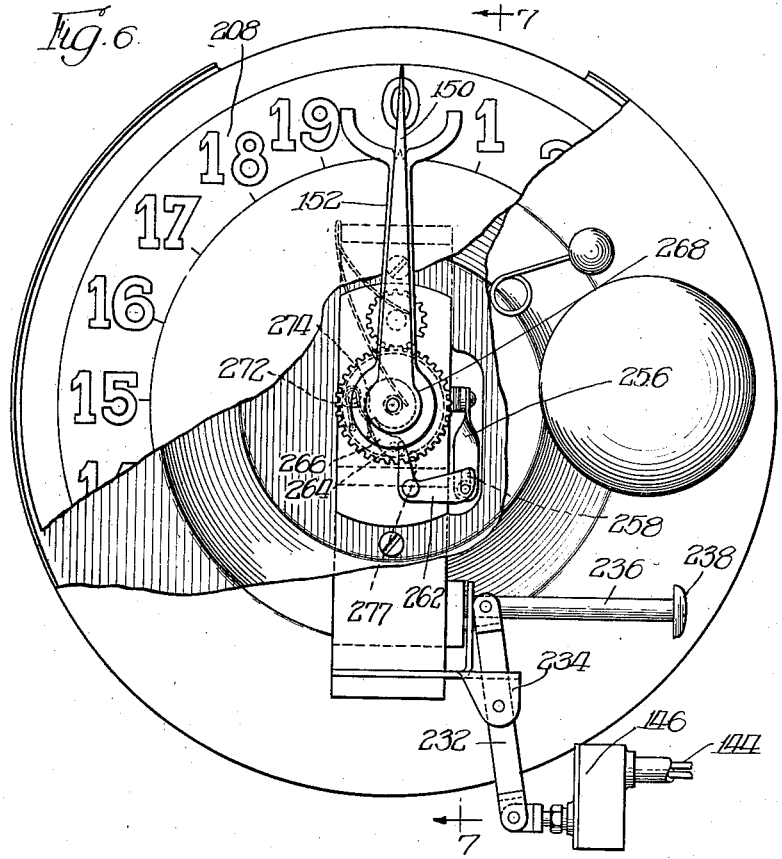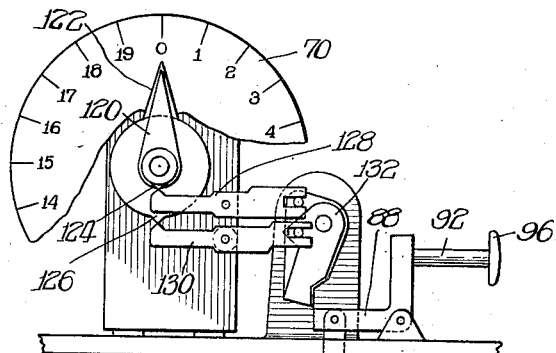

June 20, 1939.  I. R. FARNHAM ET AL  2,163,376
POINTER SETTING MECHANISM
Filed Sept. 1, 1931  4 Sheets-Sheet 3
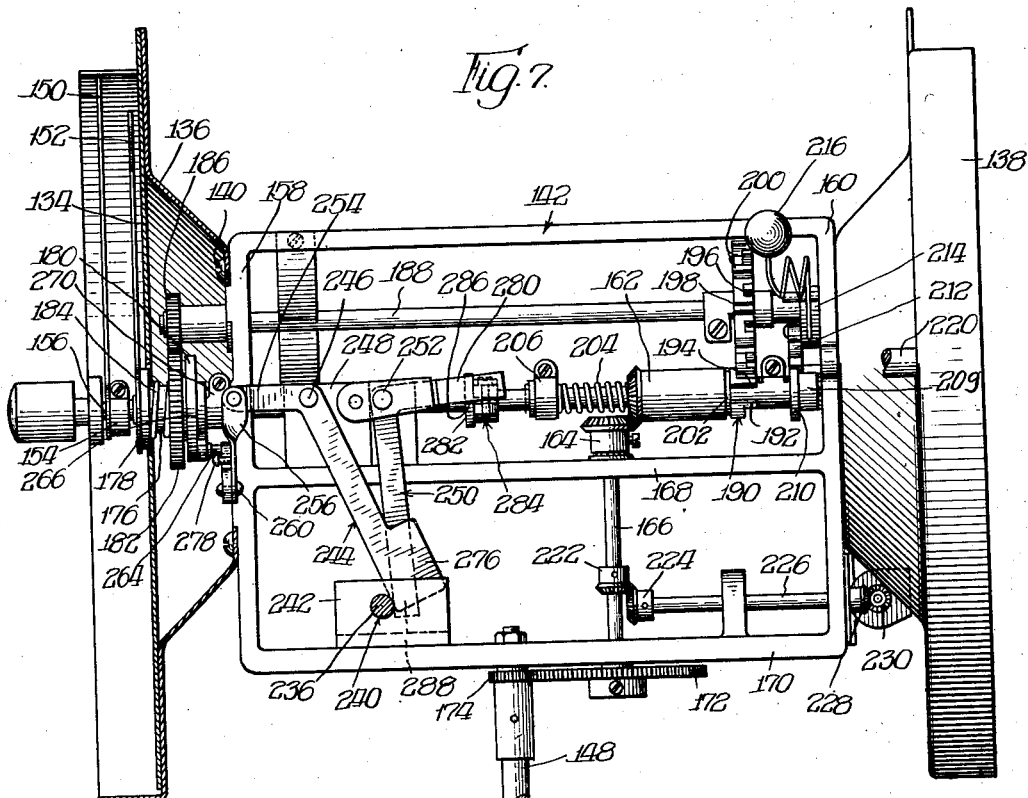
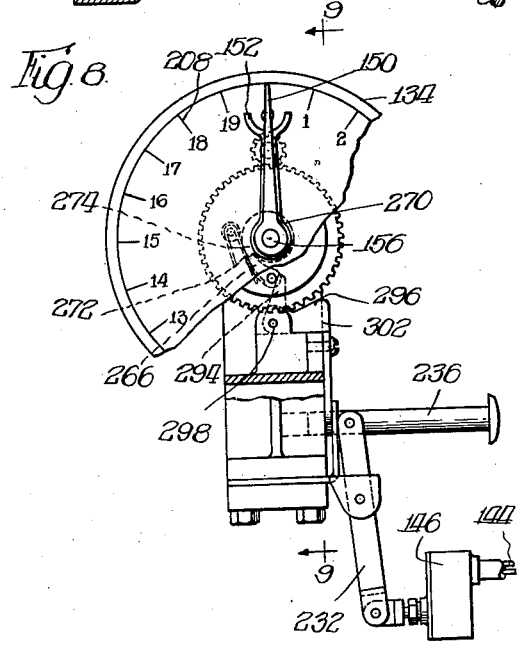
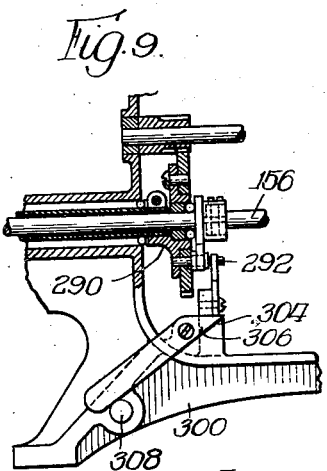
Inventors:
Ivan R. Farnham,
Robert J. Jauch,
By Wilkinson, Huxley, Byron & Knight
Attys.

June 20, 1939.   I. R. FARNHAM ET AL   2,163,376
POINTER SETTING MECHANISM
Filed Sept. 1, 1931   4 Sheets-Sheet 4
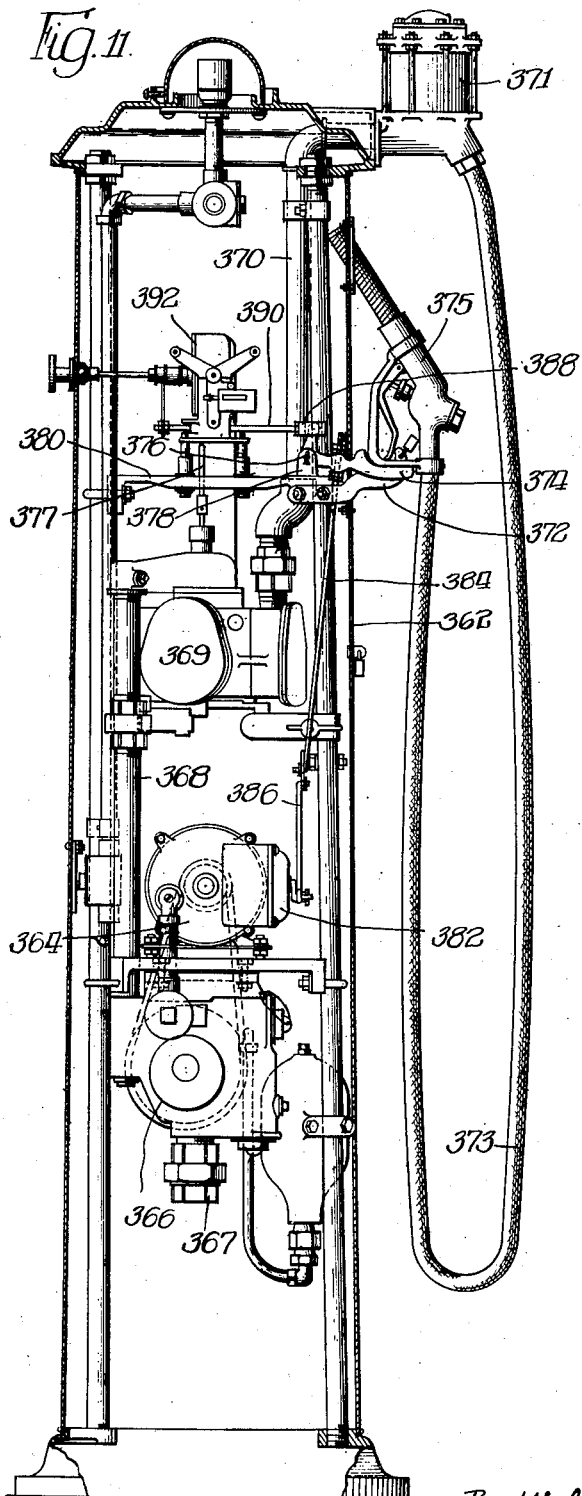
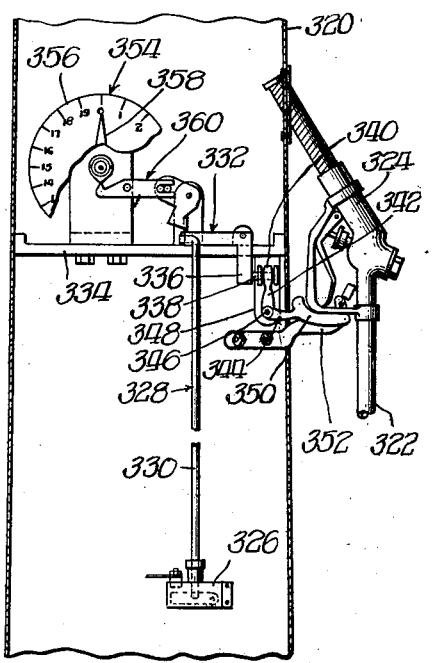
Inventors.
Ivan R. Farnham.
Robert J. Jauch,
By Wilkinson, Huxley, Byron & Knight
Attys.

Patented June 20, 1939

2,163,376

UNITED STATES PATENT OFFICE 2,163,376

POINTER SETTING MECHANISM

Ivan R. Farnham and Robert J. Jauch, Fort Wayne, Ind., assignors, by mesne assignments, to The Wayne Pump Company, Fort Wayne, Ind., a corporation of Maryland Application September 1, 1931, Serial No. 560,568

4 Claims. (Cl. 221—95)

The present invention relates to pointer setting mechanism and more in particular to novel control means for indicating means in fluid dispensing apparatus.

Among the objects of the present invention is to provide novel means manually operable from the exterior of a fluid dispensing apparatus for resetting the pointer of an indicating means to a predetermined position, by an attendant, and after the pointer of the indicating means has been moved by the dispensing of each delivery of fluid from the apparatus.

The invention further comprehends the idea of providing novel control means for controlling the operation of a power means for delivering fluid from dispensing apparatus. More particularly, the invention includes the providing of novel means associated with the indicating means provided in the apparatus which is adapted to render the power means initially inoperative except when the indicating means is in a predetermined position.

Another object of the present invention is to provide a novel control means for controlling the initial operation of a manually operated switch or other similar means for closing the circuit of an electric motor adapted to dispense fluid from a fluid dispensing apparatus, such control means being associated with an indicating means of the apparatus in such a manner as to render this switch initially operative only when the indicating means is in a predetermined position, such as a zero reading. This novel control means, therefore, has the distinct advantage of providing a means whereby operation of the fluid dispensing apparatus can be effected only after the attendant has moved the indicating means back to its initial or zero reading, thereby positively indicating to the individual receiving the fluid that the position of the indicating means at any time corresponds with the number of units of fluid actually dispensed from the apparatus.

The invention further contemplates the idea of incorporating such novel control means in a fluid dispensing apparatus having an indicating means including a plurality of pointers, one of which may indicate fractions of a unit of fluid dispensed by the apparatus, while another pointer may indicate in units the fluid so dispensed.

Still another object of the present invention is to provide a fluid dispensing apparatus including the novel means for resetting a pointer or pointers of the indicating means therefor in association with a control means constructed in accordance wtih the present invention for rendering the power means initially operative only when the pointer or pointers are reset to the initial or zero reading of the indicating means.

Other objects, features, capabilities and advantages are comprehended by the invention, as will later appear and as are inherently possessed thereby.

Referring to the drawings—

Figure 1 is a view in vertical cross section of a dispensing device having parts broken away to show in detail an embodiment of the present invention for effecting a resetting of the dial pointer;

Figure 2 is a view in end elevation of an embodiment of a clutch for use with the device disclosed in Figure 1 of the drawings;

Figure 3 is a view in end elevation of another embodiment of a clutch suitable for use with the apparatus disclosed in Figure 1 of the drawings;

Figure 4 is a view in vertical cross section of a dispensing apparatus with parts broken away to disclose in detail an embodiment made in accordance with the present invention for control of the power means for dispensing fluid;

Figure 5 is a detached fragmentary view in side elevation similar to Figure 4 and having parts broken away to disclose in detail another embodiment of a control mechanism made in accordance with the invention for controlling the power means of the apparatus;

Figure 6 is a view in side elevation of an indicating means of a fluid dispensing apparatus and having parts broken away to disclose in detail a still further modification of a control means made in accordance with the present invention;

Figure 7 is a view partly in vertical cross section and partly in side elevation of the dispensing apparatus shown in Figure 6 of the drawings and taken in a plane substantially represented by the line 7—7 of Figure 6 of the drawings;

Figure 8 is a detached fragmentary view in end elevation of a fluid dispensing apparatus and having parts broken away to disclose in detail a still further embodiment for control of the power means of the apparatus;

Figure 9 is a fragmentary view in vertical cross section taken in the planes represented by line 9—9 of Figure 8 of the drawings;

Figure 10 is a view in vertical cross section of a dispensing apparatus corresponding to that disclosed in Figure 4, showing the association between the nozzle of the apparatus and control mechanism made in accordance with the present invention; and Figure 11 is a view in cross section of a dispensing apparatus incorporating control mechanism made in accordance with the present invention, this control mechanism being associated with the nozzle of the device as shown in Figure 10 of the drawings.

Referring now more in detail to the drawings, and more particularly to Figures 1 to 3 inclusive, an embodiment constructed in accordance with the present invention and for resetting the pointer 2 of an indicating means 4 provided in a fluid dispensing apparatus 6, is disclosed as including a lever 8 pivoted, as at 10, to a bracket 12 secured by any suitable means to the outside casing 14 of the fluid dispensing apparatus. The outer end of the lever 8 protrudes through a slot 16 provided in the casing or housing 14 and has an enlarged end portion or knob 18 for convenient gripping by an attendant. The inner end of the lever 8 is loosely pivoted, as at 20, to the lower end of a link 22 which has its upper end connected to a rack 24 slidable between suitable guide means 26 of the frame 28 for supporting the indicating means 4. The indicating means 4 may comprise a dial 30 provided with indicia, such as the numerals 32, for indicating the units of a fluid actually dispensed from this fluid dispensing apparatus, this dial 30 being supported upon the frame 28 which in turn is secured to one or more cross members or supports 34 fitting within the housing or casing 14.

In the present embodiment, the pointer 2 is supported upon a shaft 36 movable or rotatable in accordance with a power means (not disclosed) including a pump for delivering a fluid, such as gasoline, or the like, through a nozzle into a container, as for example, a gasoline tank of an automobile. In this embodiment, as likewise in the subsequent embodiments disclosed, the dispensing apparatus includes a hook or other supporting means for the nozzle which automatically shuts off the power and stops further pumping of the gasoline, or other fluid. The movement of the shaft 36 is so calibrated in relation to the pump as to have movement between any adjacent numeral provided on the dial 30, to correspond to a unit of fluid being dispensed from the apparatus. The present invention contemplates the idea of providing means associated with the shaft 36 and with the previously disclosed rack 24 for returning the pointer 2 in a counter-clockwise direction from any point on the dial to the zero or initial reading. Such means in conjunction with the rack 24 and its associated mechanism, comprises a hub 38 mounted upon the shaft 36 and secured thereto, as by means of a pin 40, this hub 38 having a pinion 42 rotatably mounted thereon and adapted to have meshing engagement with the rack 24. The pinion 42 is provided with a recessed portion 44 having a cam or wedge surface 46 for retaining a ball 48 therebetween and the periphery of the hub 38.

In operation, assuming that the pointer 2 is in a position as indicated in Figure 1 of the drawings, the attendant or operator of the fluid dispensing apparatus, desiring to move the pointer back to the initial or zero position, moves the knob 18 upwardly, which causes the rack 24 to move downwardly between the guides 26 into engagement with the pinion 42. Upon initial movement of the pinion 42, the ball 48 is wedged between the cam or wedge surface 46 and the periphery of the hub 38 for effecting counter-clockwise movement of the shaft 36, as likewise the pointer 2, any suitable stop means being provided for stopping the pointer 2 at the zero reading on the dial 30. Upon release of the knob 18, the rack 24 is returned to its uppermost position by means of the coil spring 50, the pointer 2 and shaft 36 remaining stationary during such movement of the ball 48 within the recess 44 during clockwise movement of the pinion 42.

In Figure 2 of the drawings is disclosed a modified form of clutch mechanism which may be used in the device shown in Figure 1 of the drawings for effecting movement of the shaft 36 through the medium of the rack 24. Such clutch mechanism comprises a hub 52 adapted to be mounted upon the shaft 36 and which is provided with recesses 54 for retaining balls 56, each of which is adapted to be spring pressed, by the coil spring 58, along the recess 54 and into engagement with the inner surface of a pinion 60 mounted upon the hub 52, this pinion 60 being adapted to have meshing engagement with a rack, such as the rack 24. It will be quite apparent from the drawings that this clutch mechanism is in the nature of a ratchet device whereby movement of the hub 52 in a clockwise direction may be effected without the transfer of such movement to the pinion 60, although, upon rotation in a counter-clockwise direction, the balls 56 become wedged between the hub 52 and pinion 60 so that these elements have simultaneous rotary motion.

In Figure 3 of the drawings, a still further embodiment of a suitable clutch mechanism for use in conjunction with the device disclosed in Figure 1 of the drawings, is shown as comprising a ratchet wheel 62 adapted to be mounted on the shaft 36, a pinion 64 being mounted thereon and having meshing engagement with some such member as the rack 24 which is adapted to move the same, the pinion 64 having a pin 66 pressed into engagement with the teeth of the ratchet 62 by means of the leaf spring 68, whereby movement of the pinion 64 in a counter-clockwise direction causes a counter-clockwise movement of the ratchet wheel 62 and the shaft upon which the same may be mounted.

The present invention further comprehends the idea of providing novel means for controlling the operation of a power means adapted to be operated in a fluid dispensing apparatus for distributing various quantities of fluid therefrom, such control means being so associated with the indicating means provided in the fluid dispensing apparatus as to permit initial operation of the power means only when the indicating means is in a predetermined position. A fluid dispensing apparatus provided with a control means of this kind has a distinct advantage over fluid dispensing apparatuses heretofore constructed, in that this control means provides a positive control over the quantity of fluid dispensed to a customer and avoids any possibility of error in such deliveries, either intentionally or accidentally. The customer receiving the dispensed fluid is always able to determine the quantity received, inasmuch as the indicator necessarily has to be returned to the zero reading before the power means may be operated.

Referring more particularly to Figure 4 of the drawings, an embodiment made in accordance with the present invention and incorporating this idea of controlling the power means of the present fluid dispensing apparatus is shown in connection with an apparatus provided with an indicating means including a dial 70 having indicia 72 upon the face thereof and a pointer 74 mounted upon the shaft 76 and movable thereby over the face of the dial 70 for indicating the units of fluid dispensed to any particular customer at any one time. The dial 70 and shaft 76 are mounted upon a frame 78 supported upon one or more cross members or brackets 80 provided within and connected to a housing or casing 82. The fluid is delivered from a storage tank associated with the dispensing apparatus through a nozzle into a customer's container or receptacle by means of a pump operated by an electric motor in an electric circuit controlled by a switch of the push and pull type, generally designated as 84, and which may be secured to the casing 82 in any desired manner. The movement of the pointer 74 over the face of the dial 70 is so calibrated and movable with the power means as to move between adjacent numerals 72 when a unit of fluid has been delivered from the apparatus.

The switch 84 is operated to complete a circuit for the electric motor by means of the rod 86 connected to the inner arm 87 of a bell crank lever 88 pivoted, as at 90, to the bracket 80, the other arm 89 of the bell crank 88 having a rod 92 connected thereto and protruding through an opening 94 in the casing 82. This rod 92 is provided with a knob 96 adapted to be gripped by an operator or attendant for outward movement of the rod, thereby causing rotation of the bell crank lever 88 and movement of the rod 86 to effect a completion of the electrical circuit.

In order to control the initial movement of the bell crank lever 88, as likewise the initial operation of the electric motor, the pointer 74 is provided with a cam having a cam lobe 98 oppositely disposed thereto and adapted, when the pointer is set at its initial or zero reading, to contact with the cam follower 100 of a lever 102 pivoted to the frame 78, as at 104. This lever 102 is provided at its other end with a slot 106 adapted to receive a pin 108 of a second bell crank lever 110 pivoted to the support 80, as at 112.

As will be quite apparent from the drawings, the lower arm 114 of the bell crank lever 110 is so constructed as to clear the end 87 of the bell crank lever 88 when the pointer 74 is at its zero reading and the cam lobe 98 has contacting engagement with the cam follower 100. This arrangement permits the initial movement of the bell crank 88 only when this pointer 74 is in the position as shown in Figure 4 of the drawings. If the pointer 74 were in a position, as for example, opposite the numeral 2 or 3, the cam lobe 98 would be to the left of the cam follower 100 and the lever 102 under the action of the coil spring 116 would cause a counter-clockwise movement of the bell crank 110 and an outward movement of the arm 114 into the path of movement of the end 87 of the bell crank 88, thereby rendering operation of the switch 84 impossible. During the operation of the electric motor, after the bell crank lever 88 has been initially moved in a clockwise direction, and the cam lobe 98 has been moved from its engagement with the cam follower 100, the shoulder 118 of the bell crank lever 110 is adapted to engage with the inner end 87 of the bell crank lever 88 for holding the lever 102 in a position as now shown in Figure 4 of the drawings. When the bell crank 88 is again moved for effecting a disconnection of the switch 84 and into the position as shown in Figure 4 of the drawings, the arm 114 of the bell crank lever 110 is automatically moved by the spring 116 into a position for engagement with the bell crank lever 88, thereby necessitating the movement of the pointer 74 to its initial or zero reading before the switch may again be operated for dispensing a further quantity of fluid from the apparatus.

In Figure 5 of the drawings, an embodiment of the present invention is shown in connection with a fluid dispensing apparatus of the type disclosed in Figure 4 of the drawings, having a dial 70 but varying therefrom in that two pointers 120 and 122 are provided, the pointer 120 being for the purpose of indicating fractions of a unit, while the pointer 122 is for indicating units. The power means, as in the embodiment shown in Figure 4 of the drawings, is in a circuit provided with a switch 84 controlled through the movement of the bell crank lever 88, rod 92 and knob 96. In this embodiment, each of the pointers 120 and 122 is provided with cams having cam lobes 124 and 126, these cam lobes being adapted to have contacting engagement with levers 128 and 130, respectively, associated with a bell crank lever 132, these elements being operable in a similar manner as corresponding elements heretofore described and for the purpose of controlling the initial operation of the power means.

In Figures 6 and 7, a still further embodiment of the control means of the present invention is disclosed in connection with a fluid dispensing apparatus having oppositely disposed dials, such as 134, mounted in the dial supports 136 and 138 secured, as by means of the screws 140, to a frame 142 adapted to be positioned within a casing or housing of the apparatus. As in the previously described embodiments, the fluid is dispensed from this apparatus by means of an electric motor within a circuit 144 controlled by means of the switch of the push and pull type, generally designated as 146. This motor is operatively associated with a jack shaft 148 having an end journaled in the cross member 170 of the frame 142 and adapted, through suitable mechanism, to cause movement of the pointers 150 and 152 over the face of the dials 134, the movement of these pointers being calibrated so as to indicate the number of units and fractions of units of fluid being dispensed from the apparatus.

Each of the pointers 150 indicates the fractions of units delivered by the apparatus and is provided with a hub 154 mounted upon a shaft 156 supported in suitable bearings provided within the upright portions 158 and 160 of the frame 142. This shaft has a beveled pinion 162 rotatably secured thereto and meshing with a beveled pinion 164 provided on the upper end of a jack shaft 166 suitably mounted in the cross members 168 and 170 of the frame 142, the lower end of this jack shaft 166 extending downwardly beneath the member 170 and having a gear 172 secured thereto and meshing with a pinion 174 secured to the jack shaft 148.

Each of the pointers 152 is mounted upon a hub or spool 176 rotatably mounted upon the shaft 156, between the collars 178 and 180 of which, is mounted a gear 182 spring pressed into engagement with the collar 180 by a coil spring 184, this gear having meshing engagement with a pinion 186 mounted upon a shaft 188 journaled in the side members 158 and 160 of the frame 142 and disposed substantially parallel and in spaced relation to the shaft 156. The shaft 188 is caused to rotate by rotation of the shaft 156 through the medium of a gear 190 having spaced teeth 192 and 194 adapted to mesh with the short and long teeth 196 and 198, respectively, of the gear 200 mounted upon the shaft 188.

Upon rotation of the shaft 148, the pinion 164 is caused to rotate for driving the pinion 162 which is frictionally held in relation to the shaft 156 against the collar 202 by means of a coil spring 204 interposed between the pinion 162 and a collar 206 secured on the shaft 156. It will be clearly seen that for each revolution of the pointers 150, the pointers 152 are adapted to be moved through a distance corresponding to the distance between numerals 208.

The shaft 156 is further provided with a collar 209 having a cam surface 210 over which passes a cam follower 212 of a trip mechanism 214 provided with a knob 216, this trip mechanism being adapted to be received in a notch of the cam surface for allowing the knob 216 to be suddenly thrown against the bell provided on the shaft 220, thereby indicating to the customer when each successive unit of fluid has been dispensed by the apparatus. The jack shaft 166 is further provided with a pinion 222 meshing with a pinion 224 on a shaft 226 which has another pinion 228 at its outer end for operating a totalizer or counter 230 indicating the total number of units of fluid dispensed by the apparatus.

As in the previous described embodiment, the switch 146 is operated to complete the circuit 144 through a lever 232 pivoted to a bracket 234 and having a rod 236 connected at its upper end which is provided with a knob 238 exteriorly disposed relative to the casing for the dispensing apparatus, whereby the operator or attendant may control the switch 146. The end of rod 236 normally extends into apertures 240 provided in a block 242 when the switch is in a position to effect a completion of the circuit 144. In order to control the movement of the rod 236 whereby the switch 146 may be initially operated only when the pointers 150 and 152 are in their initial or zero position, as shown in Figure 6 of the drawings, novel means is provided for controlling the movement of the rod 236.

Such means includes a locking lever 244 pivoted, as at 246, to a block 248 and a second locking lever 250 likewise pivoted, as at 252 to this block 248. The lever 244 is in the form of a bell crank and has its arm 254 pivoted to a link 256 having an elongated slot 258 for reception of a pin 260 provided in one end of the bell crank lever 262, the bell crank lever 262 being adapted to contact with a pin 264 provided on the hub 176 which also provides a mounting for a dog 266 adapted to have contacting engagement with the cam surface 268 provided on a collar 270 secured to the shaft 156 adjacent the spool 176. This dog 266 is normally held in engagement with the cam surface 268 by means of a spring 272.

When the pointers 150 and 152 are in their initial or zero position, as shown in Figure 6 of the drawings, the dog 266 is in engagement with a shoulder 274 provided on the collar 270, this engagement causing the pin 264 to engage with the bell crank lever 262 for movement of the link 256 and downward movement of the arm 254 of the locking lever 244, whereby the lower arm 276 of this locking lever is moved upwardly out of alignment with the apertures 240 thereby permitting the rod 236 to be received therein and for effecting operation of the switch 146. The movement of the pointers 150 and 152 to their zero or initial reading, as likewise the movement of the collar 270 and bell crank lever 262 is limited by a pin 278 in the member 158 in the frame 142 which acts as a stop confining movement of the lower arm 276 of the bell crank lever 244 to movement just sufficient to clear the openings 240.

Also, the bell crank lever 250 is provided with a block 280 which is adapted to ride over the cam surface 282 of a collar 284 secured to the shaft 156, the block 280 being adapted to engage with a shoulder 286, at substantially the same time that the shoulder 274 engages with the dog 266, for throwing the lower arm 288 of the bell crank lever 250 to the right, as shown in Figure 7 of the drawings, to also clear the openings 240, and to permit reception of the rod 236 in the openings 240, this arm 288 being adapted to move into alignment with these openings 240 when the rod 236 is removed and the pointers 150 and 152 are in a position other than their zero or initial position.

In Figures 8 and 9 of the drawings is disclosed an embodiment quite similar to the embodiment disclosed in Figures 6 and 7 and for controlling the operation of the switch 146 provided within the circuit 144 which also includes therein the electric motor referred to in the previously described embodiment. The fluid dispensing device with which this embodiment is disclosed is similar to the one shown in Figures 6 and 7 and is provided with the dials 134 having the reference numerals 208 placed thereon and over the face of which pointers 150 and 152 move. As in the previously described embodiment, the collar 270 is provided upon the shaft 156 and has a shoulder 274 adapted to engage with the dog 266 pressed into contacting engagement with the surface of the collar 270 by means of the spring 274. The dog 266 is secured to a collar or hub 290, corresponding with the collar or spool 176 of the other embodiment, by a pin 292 extending or projecting therefrom and adapted to have engaging contact with the arm 294 of a bell crank lever 296 pivoted, as at 298, to the frame 300. The bell crank lever 296 is limited in its movement, when the shoulder 274 is in contact with the dog 266 and the pointers 150 and 152 are in their zero or initial position, by the engagement of its outer arm 302 with the upper surface of the block 304. This outer arm 302, when the arm is in contacting engagement with the block 304, engages the end of a lever 306 for moving its lower end out of alignment with the aperture 308 adapted to receive the inner end of the rod 236 operably associated with the lever 232 for controlling the switch 146.

It will be clearly apparent, that when the pointers 150 and 152 are in their initial or zero reading, the lever 306 is out of alignment with the opening 308 whereby initial operation of the switch 146 may be effected. In this respect, the present embodiment is substantially the same as the previously described embodiment with the exception that in the present device one lever only is employed for effecting a control of the switch 146. It is of course understood that any number of pointers may be associated with this single control means.

If desired, a dispensing apparatus may incorporate the structure disclosed in Figure 10 of the drawings. The dispensing apparatus in this figure comprises a casing 320 enclosing a suitable motor for pumping fluid, such as gasoline or the like, through a flexible hose 322 and a manually operated nozzle 324. This motor is within a circuit controlled by a contact switch 326 which is operated by initiating means, generally referred to as 328. This initiating means includes a rod or the like 330 connected to operate the switch 326 at one end and connected at its other end to an arm of a bell crank lever 332 pivotally supported upon a frame member 334 fitting within the casing 320. The bell crank lever 332 has a depending leg or arm 336 provided with a rod 338 projecting therefrom which is embraced by a collar 340 integral with the arm 342 of a bell crank 344, this bell crank being pivoted as at 346 between oppositely disposed brackets 348 depending from the frame member 334. The bell crank 344 is provided with an arm 350 projecting through a suitable opening in the casing 320 and being bifurcated at the end to provide a hook adapted to receive the nozzle 324, this nozzle 324 being normally supported upon a bracket 352 projecting from the casing 320 and in a position whereby the nozzle 324 may be supported thereon in its normal inoperative position, as shown in this figure.

It will be apparent that when the arm 350 is in its uppermost position, the rod 330 will be raised for operating the switch 326 and the motor associated therewith. This upward position of the arm 350 is its normal position during the operation of the motor for pumping and dispensing gasoline or a similar fluid. When the nozzle 324 is returned into the position as shown in this figure, the same engages the bifurcated arm 350, and this arm is lowered into the position as shown to move the bell crank lever 332 and rod 330 to shut off the motor through the switch 326.

The dispensing apparatus shown in this embodiment likewise includes indicating means, generally referred to as 354, and comprises a dial 356 and a pointer 358, this pointer 358 being movable over the face of the dial 356 in accordance with the fluid discharge through the nozzle 324, all in accordance with the disclosure in Figure 11, hereinafter more fully set out. The present invention, as in the hereinbefore described embodiments, comprehends novel control means, generally referred to as 360, for controlling the operation of the initiating means 328 whereby the same is initially operable only when the indicating means is in a predetermined position. This control means 360 corresponds in all essentials with the same mechanism shown in Figure 4 of the drawings, and can be readily understood by reference to a description of that figure.

In Figure 11 of the drawings, an embodiment of the present invention is disclosed in connection with a dispensing apparatus comprising a casing or housing 362 enclosing a motor 364 for operating a pump 366 which is connected on the suction side thereof to a pipe 367 leading to a source of supply (not shown). The outlet side of the pump 366 is connected to a pipe 368 connected to the inlet side of a meter 369 which may be of the piston displacement type, or any suitable type accurately measuring the amounts of liquid supplied thereto and passing therethrough, the measured liquid flowing through a pipe 370 to the sight gauge 371 and being dispensed through the hose 373 and the hand operated nozzle 375. This nozzle 375 is normally supported in its inoperative position as shown in this figure, and upon a bracket 372 projecting outwardly from the casing 362, this nozzle likewise engaging a hook member 374 in the form of a bell crank lever which projects through a suitable opening in the casing 362 and is pivoted for movement as at 376 to brackets 378 secured to a frame member 380. This bell crank lever has its outwardly extending leg connected to a contact switch 382, for operating the motor 364, through the rods 384 and 386, the upstanding leg of this bell crank lever in turn being connected by way of a collar 388 at the end of a rod 390.

This dispensing apparatus may be provided with the indicating means disclosed in either Figures 7, 8 or 9, and may have the structure disclosed in these figures for operating the same. For the purpose of this disclosure, this mechanism for operating the indicating means may be generally referred to as 392, and the rod 390 corresponds with either the rod 236 of Figures 7 and 8, or rod 308 of Figure 9 of the drawings. The meter 369 operates a rod 377 corresponding to rod 148 of Figure 7 of the drawings, whereby the indicating means 392 may be operated in accordance with the meter 369.

It will be readily appreciated that the hook member 374 can be operated only when the rod 390 is free to move from right to left, as disclosed in this figure, movement of this rod 390 being controlled as disclosed in Figures 7 to 9 inclusive. The rod 390 is free to move to the left in Figure 9 only when the indicating means is at a predetermined position, or in its zero reading and the nozzle 370 has been moved from the hook member 374 to supply fluid to a tank, as for example, the tank of an automobile or the like which has driven up adjacent this dispensing apparatus. Upward movement of the hook member 374 operates the switch 382 through the rods 384 and 386 to initiate operation of the motor and pump for discharging fluid through the nozzle 375 when the valve thereof is suitably operated. After the nozzle has been replaced upon the support 372, the hook member 374 is moved downwardly to disengage the switch 382 and to move the rod 390 to the right, as disclosed in this figure. As in the embodiment shown in Figures 7 to 9 inclusive, operation of the motor and pump can be initiated only when the nozzle 370 is removed from the hook member 374 and the rod 390 is free to move to the left.

While we have herein described and upon the drawings shown illustrative embodiments of the invention, it is to be understood that the invention is not limited thereto but may comprehend other constructions, arrangements of parts, details and features without departing from the spirit of the invention.

We claim:

1. In a fluid dispensing apparatus, the combination of power means, a member having an aperture therein, said power means including an electric motor for delivering fluid, said means including a circuit and a manually operable switch for controlling said circuit, said switch having an extension normally registerable in an aperture whereby said circuit is initially completed and for operation of said motor, indicating means for determining quantities of fluid dispensed by said apparatus and means adjacent said first named member operated by said indicating means and normally releasably held out of alignment with said aperture when said indicating means is in a predetermined position, said means being released upon movement of said indicating means for alignment with said aperture to render said switch inoperative upon removal of said extension from said aperture and until said indicating means is returned to said predetermined position.

2. In a fluid dispensing apparatus, the combination of power means, a member having an aperture therein, said power means including an electric motor for delivering fluid, said means including a circuit and a manually operable switch for controlling said circuit, said switch having an extension normally registerable in an aperture for completion of said circuit and for operation of said motor, indicating means including a plurality of pointers for determining quantities of fluid dispensed by said apparatus, and means adjacent said first named member releasably held and controlled by movement of said pointers, said means including members adapted to be held out of alignment with said aperture for rendering said switch initially operable only when said pointers are in a predetermined position.

3. In a fluid dispensing apparatus or the like, the combination of means for discharging quantities of fluid, indicating means operable for determining the quantities of fluid delivered from said apparatus, means for initiating discharge of said fluid, said means including a movable member, and means associated with said indicating means and movable into and out of the path of movement of said movable member, said last-mentioned means being normally out of the path of movement of said movable member when said indicating means is in its zero recording position whereby said initiating means may be operated.

4. In a fluid dispensing apparatus or the like, the combination of means for discharging quantities of fluid, indicating means operable for determining the quantities of fluid delivered from said apparatus, means for initiating discharge of said fluid, said means including a movable member, and means associated with said indicating means movable into and out of the path of movement of said movable member, said last mentioned means being normally out of the path of movement of said movable member when said indicating means is in its zero recording position whereby said initiating means may be operated, said last mentioned means being disposed in the path of said movable member when said indicating means is in other than zero position to prevent initiating said second named means until said indicating means has been moved to zero position.

IVAN R. FARNHAM.
ROBERT J. JAUCH.